(12) United States Patent
Edren (10) Patent No.: US 11,912,095 B1
(45) Date of Patent: Feb. 27, 2024

(54) SUSPENSION SYSTEM WITH ROTATION INDUCING COMPONENT

(71) Applicant: Zoox, Inc., Foster City, CA (US)

(72) Inventor: Johannes Edren, Belmont, CA (US)

(73) Assignee: ZOOX, INC., Foster City, CA (US)

( * ) Notice: Subject to any disclaimer, the term of this patent is extended or adjusted under 35 U.S.C. 154(b) by 0 days.

(21) Appl. No.: 18/194,555

(22) Filed: Mar. 31, 2023

(51) Int. Cl.
*B60G 17/06* (2006.01)
*B60G 15/06* (2006.01)
*B60G 15/04* (2006.01)

(52) U.S. Cl.
CPC ............ *B60G 17/06* (2013.01); *B60G 15/04* (2013.01); *B60G 15/068* (2013.01); *B60G 2200/142* (2013.01); *B60G 2202/22* (2013.01); *B60G 2202/441* (2013.01)

(58) Field of Classification Search
CPC ...... B60G 17/06; B60G 15/04; B60G 15/068; B60G 2200/142; B60G 2202/22; B60G 2202/441
See application file for complete search history.

(56) References Cited

U.S. PATENT DOCUMENTS

| | | | | |
|---|---|---|---|---|
| 4,007,894 A | * | 2/1977 | Hartel | B64C 25/60 244/104 FP |
| 11,712,964 B1 | * | 8/2023 | Drach | B60K 7/0007 180/245 |
| 2005/0067798 A1 | * | 3/2005 | Uchiyama | B60G 21/0555 280/5.511 |
| 2006/0220918 A1 | * | 10/2006 | Stockwell | G01G 19/07 340/960 |
| 2018/0170140 A1 | * | 6/2018 | Lee | B60G 17/06 |

\* cited by examiner

*Primary Examiner* — Paul N Dickson
*Assistant Examiner* — Matthew D Lee
(74) *Attorney, Agent, or Firm* — Lee & Hayes P.C.

(57) ABSTRACT

A suspension system includes a rotation inducing member for causing a cylinder to rotate relative to piston rod in response to an axially-applied force. In examples, the rotation inducing member may be embodied as a bushing structure. In other examples, the cylinder and/or the piston rod may include the rotation inducing member. The inducement of rotational motion may help overcome stiction or similar frictional forces between the piston rod and the cylinder.

20 Claims, 5 Drawing Sheets

SUSPENSION SYSTEM WITH ROTATION INDUCING COMPONENT

BACKGROUND

Vehicles may include a suspension system to enhance the comfort of passengers of the vehicle or improve the performance of the vehicle as it travels across uneven surfaces and maneuvers through curves. A suspension system may include assemblies at each wheel of the vehicle including a spring to reduce the force transferred to a chassis of the vehicle as the vehicle travels across a depression or over bump in the surface, and a damper to control oscillations or rebound of the spring as it reacts to the force input. In a passive suspension system, the spring and damper react to the energy transmitted to the spring and damper as the wheel travels across the uneven surface and/or around a turn.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

This disclosure generally relates to suspension systems, such as for use in an automobile or other land-borne vehicle. The suspension system generally couples a wheel of a vehicle to a chassis or frame of the vehicle, e.g., for controlling movement of the wheels relative to the chassis. In some examples, a suspension system may be associated with a wheel of the vehicle or with multiple wheels of the vehicle. The suspension system can include spring, struts, and/or additional components.

Some conventional suspension systems include a strut or damper. For instance, the strut or damper can include a cylinder and a rod disposed partly in, and configured to move relative to, the cylinder. For example, under axial loading, e.g., when the vehicle including the suspension system drives over a rough road, the strut may act to absorb some of the axial force, improving ride comfort and improving contact between a tire and the road for safety purposes.

Also in these conventional system, the cylinder can contain a fluid, such as a hydraulic fluid, and the piston can be sealed relative to the cylinder, e.g., to limit or prevent leakage of the fluid. In operation, the interface of the seal with the cylinder and the rod creates friction, e.g., stiction when the seal and rod are relatively static to each other. Moreover, the better the seal, e.g., the more reliably the strut prevents fluid leakage, the larger the magnitude of the friction can be. This friction must be overcome for the rod to move relative to the cylinder. Accordingly, the greater the friction, the greater the force required to overcome the friction. Friction and damping may be similar, e.g., in that they both generate a force opposing the direction of travel (e.g., of the rod relative to the cylinder). However, friction is a relatively constant value, whereas viscous damping is proportional to the velocity. Thus, at very low speeds, the generated force is dominated by friction, and thus any tuning of the damper has little to no impact. In these conventional systems, the result is little to no damping of relatively lower-magnitude forces, because the rod and the cylinder act as a single, rigid member joined at the seal, until the friction is overcome. Lack of damping at these relatively lower forces may result in ride discomfort, inadequate suspension performance to provide proper tire/surface interface(s), and/or complicate suspension design. Aspects of this disclosure may allow for reducing and/or overcoming the stiction/friction to reduce the load path and/or to allow for low speed damper tuning, one or both of which may contribute to better ride comfort.

Conventionally, the magnitude of the friction created at the seal has been influenced predominately by seal design. For example, some applications may employ a relatively less effective seal, e.g., which may lead to some leakage, because of the relatively lower forces required to overcome the associated friction. As noted above, other applications may require substantially leak-free seals, resulting in higher friction, thereby sacrificing ride quality and/or suspension performance at lower axial loads.

Aspects of this disclosure are directed to improved systems and techniques to overcome stiction in a strut or damper by introducing a rotational force at the seal. For example, aspects of this disclosure include inducing relative rotational movement between the cylinder and the rod to overcome the friction caused by the seal therebetween. As detailed further herein, systems according to this disclosure can include a rotation inducing component configured to induce rotation when exposed to an axial load. In examples, the induced rotation, along with the accompanying axial force, overcome the friction force, e.g., at lower axial forces than when only pure axial forces are present.

In some examples, the present disclosure relates to a suspension system, such as a suspension system for a vehicle. The suspension system includes a damper, which may be a strut. The damper includes a cylinder extending along an axis and a piston rod disposed partially in the cylinder. The piston rod is configured to move relative to the cylinder. For example, the piston rod may be configured to move axially relative to the cylinder, e.g., generally along a longitudinal axis defined by the cylinder. The piston rod may also be configured to rotate relative to the cylinder, e.g., about the axis of the cylinder. Also in examples, a seal may be provided between the piston rod and the cylinder, e.g., between an inner surface of the cylinder and an outer surface of the piston rod. As described above, the seal may introduce some friction between the cylinder and the piston rod. For example, the friction may be embodied as stiction that counteracts axial forces that would, absent the stiction, cause the cylinder to move relative to the piston rod. In some examples, the disclosed techniques can also be used to reduce dynamic friction in addition to stiction.

Examples of this disclosure also include a rotation inducing component configured to rotate in response to an applied axial load. For example, the rotation inducing component can be associated with the piston rod and/or with the cylinder, to facilitate relative rotation of the piston rod and the cylinder. In some examples, the relative rotation caused by the rotation inducing component causes relative movement of the piston rod and the cylinder at the seal which will, along with the axial force, overcome the stiction at the seal, as discussed above.

In some examples described herein, the rotation inducing component can include a bushing structure coupled to a distal end of the piston rod, e.g., an end of the piston rod spaced from the cylinder. Conventionally, one or more bushings may be provided at the distal end of a piston rod of a strut to dampen forces experienced at that location, e.g., proximate a junction of the piston rod to a chassis or other portion of the vehicle. Conventional bushings generally comprise elastomeric materials and may have an axially-symmetrical shape, such as a cylindrical shape, a frusto-conical shape, or the like. Conventional bushings may be coupled to the distal end of the piston rod and be configured to dampen axial forces, e.g., forces experience along an axis of the bushing (and the piston rod). Bushing structures according to this disclosure may be configured to dampen axial forces, as with conventional bushings, but also to rotate or twist with the application of the axial force.

In non-limiting examples, a bushing structure according to this disclosure can include a first end coupled to a piston rod and a second end spaced from the first end in an axial direction. The bushing structure can also include a sidewall extending between the first end and the second end. Without limitation, the sidewall may be cylindrical, tapered, or have some other external profile. According to examples of this disclosure, the bushing structure may also include one or more voids formed in the sidewall. For examples, the void(s) may be angled relative to a plane normal to a central axis of the bushing structure. In examples, the void(s) may be helical or spiraled. The void(s) may create weakened sections of the bushing that will collapse under the axial force. Because the void(s) can be angled, under the axially-applied force, e.g., between the first end and the second end, the collapse of the voids will also cause relative rotation of the first surface relative to the second surface. Thus, if the first end is fixed to the piston rod and the second end is fixed relative to a chassis, frame element, or other portion of the vehicle, the piston rod will rotate relative to the chassis or other element under the axial force. In some examples, the sidewall of the bushing structure may define a central or axial opening, and the void(s) may extend from an outer surface of the sidewall to the central opening. Moreover, the distal end of the piston rod may be received in the central opening.

In non-limiting examples, a bushing structure according to this disclosure can include a first end coupled to a piston rod and a second end spaced form the first end in an axial direction. The bushing structure can also include a helical or spiral sidewall extending between the first end and the second end. For example, the sidewall can be formed of one or more strands wound about a central axis to form one or more helix-shaped portions. When multiple strands and/or helix-shaped portions are provided, the strands may be intertwined, e.g., as alternating strands. Moreover, individual of the strands/helix-shaped portions may have different properties. For example, a first helical portion may be formed of a first material and a second helical portion may be formed of a second material. The materials may have different material properties, e.g., different hardness, different durometer rating, different profile, and/or the like. Moreover, a first helical portion may have a first strand diameter and a second helical portion may have a second strand diameter. In examples, the helically-arranged portions may define an axial opening, e.g. extending along an axis of the bearing. The distal end of the piston rod may be received in the axial opening, for example.

In operation, the helix-shaped sidewall of the example bushing structure just described may rotate under an axial, e.g., compressive, force. For example, when an axial force is applied to the bushing structure, the angled, e.g., helical strands at least partially redirect the force along the strands, causing some rotation of the first end to the second end. For example, similar to compression and extension of a compression spring, the opposite ends of the helical sidewall will experience some "twisting," resulting in the relative rotation of the first end of the bushing structure to the second end of the bushing structure. In examples, when the first end is fixed to a piston rod and the second end is fixed relative to a vehicle, an applied axial force will cause rotation of the piston rod relative to the vehicle. When the cylinder is also fixed relative to the vehicle, the piston rod will also rotate relative to the cylinder.

In non-limiting examples of this disclosure, the rotation inducing component may be incorporated into a component other than a bushing structure. For example, in at least some examples, the rotation inducing component may be incorporated into the cylinder. For example, the cylinder may comprise a first cylindrical portion, proximate an open end of the cylinder and a second cylindrical portion, proximate a closed end of the cylinder. In examples, a spacer connects the first cylindrical portion to the second cylindrical portion. The spacer may induce a rotational motion, as detailed herein. For example, the spacer may include one or more angled, helical, or spiral sections fixed to both the first cylinder portion and the second cylinder portion. As with the helical sidewall discussed above, axial forces applied to the spacer will cause the angled sections to rotate, thereby rotating the first cylinder portion relative to the second cylinder portion. When the second cylinder portion is fixed relative to the vehicle, e.g., relative to a wheel of the vehicle, the first cylinder portion rotates relative to the vehicle. Moreover, when the piston rod is fixed relative to the vehicle, the first cylinder portion also rotates relative to the piston rod, proximate the sealing interface between the cylinder and the piston rod.

In some examples, a rotation can be applied to a rod and/or seal such that stiction is overcome by the rotating force but the effects of rotation on dynamic friction when the rod moves longitudinally along the seal are minimized. For example, the disclosed techniques may provide an impulse rotation force to overcome stiction between a rod and seal and then the rod and seal no longer rotate relative to each other while the rod moves longitudinally along the seal to mitigate non-linear friction profiles between the rod and the seal. In some examples, the mechanisms to rotate the rod and/or seal may "reset" when the two are stationary to each other. For example, the rod may initially rotate and then no longer rotate when moving longitudinally. When the rod is no longer moving longitudinally, it may then rotate the other direction as a reset to prepare for the next movement or the rod may rotate the other direction when transitioning from being static to dynamic longitudinal movement. In other words, the relative rotation of rod to seal may only occur when the rod transitions from being static to moving longitudinally. In some examples, an instantaneous force or change in position (longitudinally) may induce a twisting motion such that a rod twists from an initial position and then returns to the initial position after the twist has been performed and further longitudinally directed forces may no longer cause a twisting motion. In some examples, a change in longitudinal force/position change may cause a twist and a constant longitudinal force/change in position may not.

In aspects of this disclosure, a vehicle includes a chassis and a plurality of wheels. In examples, one or more of the wheels has an associated suspension system in accordance with examples described herein. The suspension system may be disposed between the chassis and the one or more wheels to dampen forces between the chassis and the wheel(s). For example, the suspension system can include a strut or other damping member including a cylinder and a piston rod configured to move relative to the cylinder. A rotation inducing component is configured to generate relative rotation of the cylinder and the piston rod, to overcome a friction, e.g., stiction, at a seal between the cylinder and the piston rod. In examples, the rotation inducing component may be a bushing structure. In other examples, the rotation inducing component may including a spacer at the cylinder and/or the piston rod.

The systems and techniques may provide improved suspension on vehicles. For example, by inducing rotational motion, the suspension systems described herein may overcome stiction at a sealing interface under a (relatively) lower axial force. In some examples, the suspension systems described herein may allow for better damping at lower axial forces. Such damping may provide a more comfortable ride for passengers in a vehicle implementing the suspension system(s) described herein.

The techniques and systems described herein may be implemented in a number of ways. Example implementations are provided below with reference to the figures.

Figure 1A:
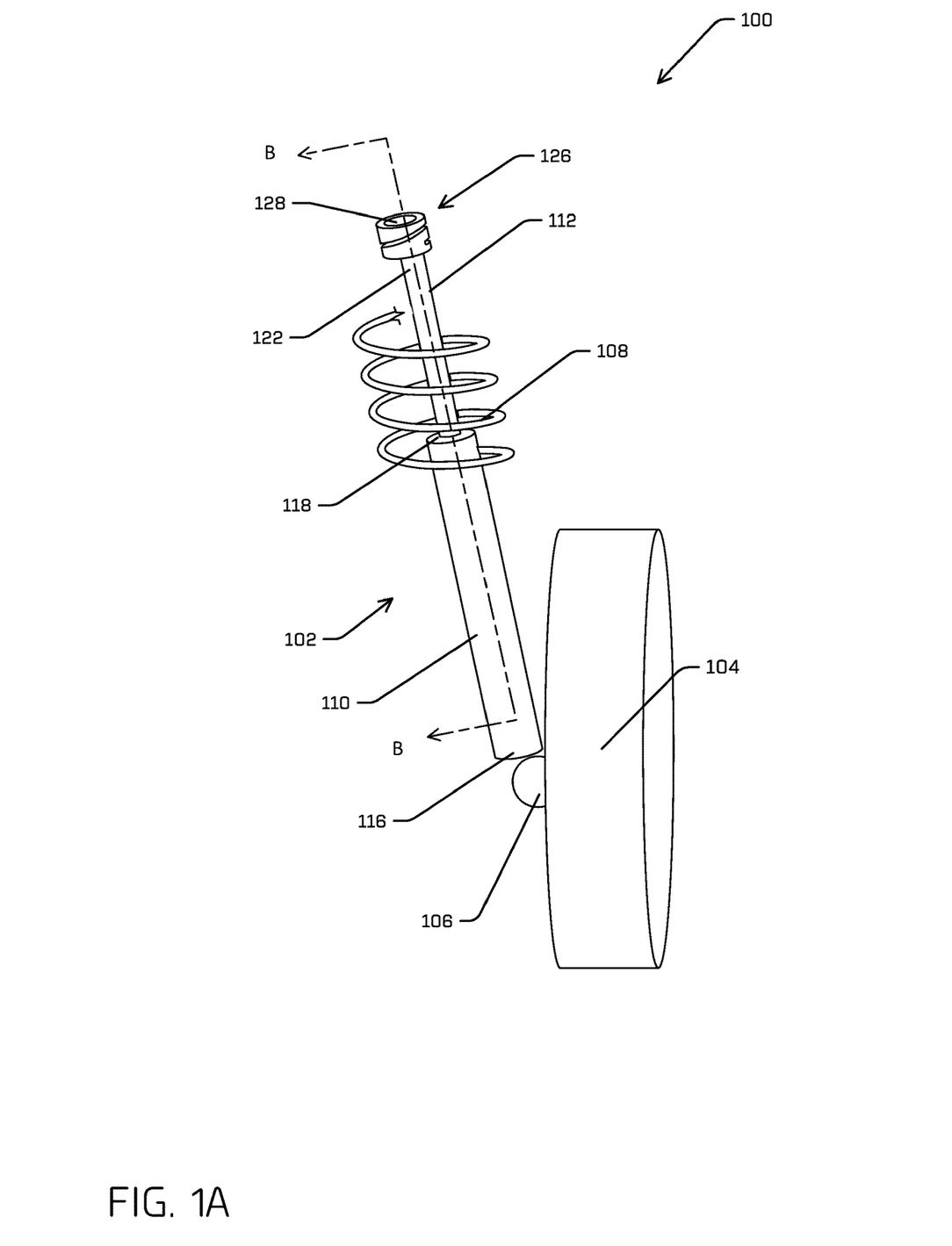
FIG. 1A is a perspective view of aspects of a suspension system configured to induce relative rotation of components in response to an input axial force, in accordance with aspects of this disclosure.
Figure 1B:
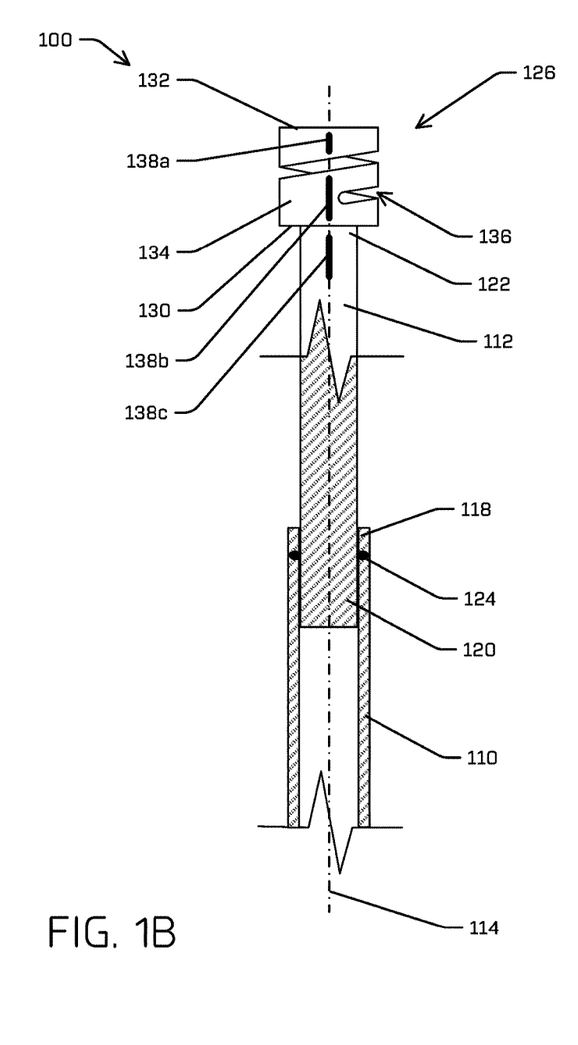
FIGS. 1B and 1C are partial cross-sectional views of the suspension system of FIG. 1, taken along section line B-B in FIG. 1A, showing details of a rotation inducing component including a bushing structure, in accordance with aspects of this disclosure.
Figure 1C:
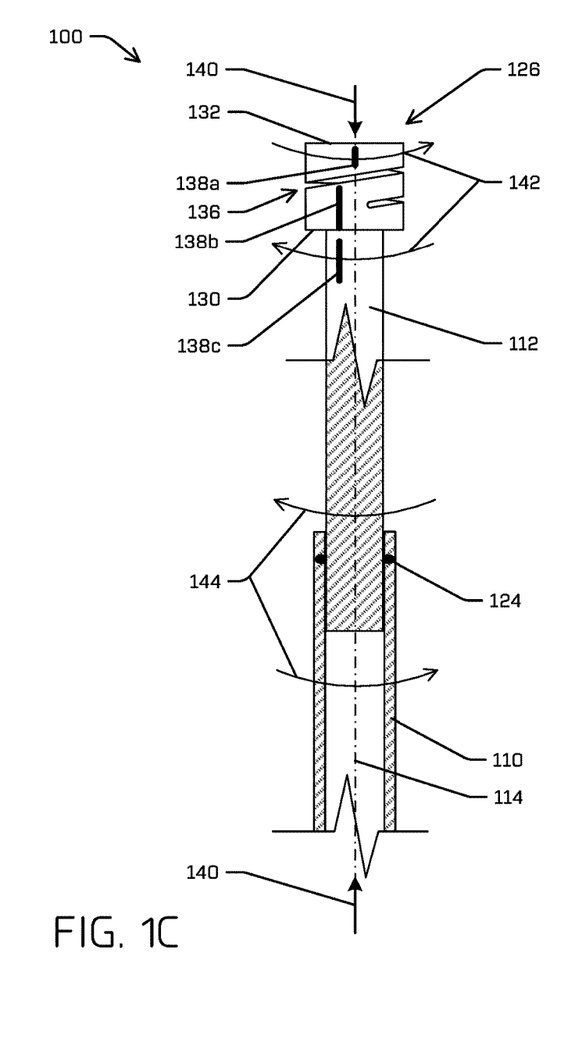

FIGS. 1A-1C illustrate an example of a suspension system with a rotation inducing component for overcoming friction in the suspension system. The illustration is made in conjunction with a wheel of a vehicle suspension system. However, the systems and techniques as described may be employed in other types of suspension systems and/or in environments other than a vehicle suspension. The same effect and/or benefits described with the illustrated embodiment, may be achieved in other environments and contexts. Accordingly, the illustrations of FIGS. 1A-1C are only examples and not intended to limit the application of the suspension system as described.

In more detail, FIG. 1A is a perspective view of aspects of a suspension system 100, and FIGS. 1B and 1C are partial cross-sectional views of the suspension system 100. As shown, the suspension system 100 includes a damping member 102 associated with a wheel 104.

Illustrated conceptually is a joint 106 coupling a first, lower end of the damping member 102 to the wheel 104. For example, the joint 106 may include a steering knuckle and/or hub carrier. The joint 106 can include one or more bearings, joints, and/or other components. A second, upper end of the damping member 102 may also be connected to a (not illustrated) vehicle body. For instance, the vehicle body can include a frame, chassis, unibody member, or the like. The suspension system 100 may also include additional and/or different components for securing to the wheel 104 and/or the vehicle, including but not limited to tie rods, track rods, radius rods, control arms, and/or the like.

A vehicle (not shown in FIGS. 1A-1C) is configured to traverse over a road surface via the wheel 104. During travel, the wheel 104 may experience forces that move the wheel 104 in the vertical direction, for example when going over a bump or falling into a pothole. The damping member 102 and a compression spring 108 generally are configured to counter, absorb, and/or dampen these forces. In examples, the suspension system 100 may generally correspond to a MacPherson strut. For example, the MacPherson strut may include the spring 108 to allow for steering and also dampen forces. Aspects of this disclosure may be useful with MacPherson struts, at least because MacPherson struts may require the damper, the bearings, the seals, and other components to carry relatively larger side loads and bending loads. Accordingly, these types of struts may require additional stiffening, e.g., from thicker rods, cylinders, seals, and/or the like. This stiffening may result in higher friction in the damping member 102, e.g., as stiction as described herein.

The damping member 102 can include a cylinder 110 and a piston rod 112. The cylinder 110 and the piston rod 112 are generally elongate members, extending along a longitudinal axis 114 (shown best in FIGS. 1B and 1C). The cylinder 110 extends from a first, lower closed end 116 to a second, upper open end 118 configured to receive the piston rod 112. The piston rod 112 extends from a first, lower end 120, received in the open end 118 of the cylinder 110, to a second, distal end 122 spaced from the cylinder 110. The piston rod 112 is configured to move relative to the cylinder 110. For example, the cylinder 110 and the piston rod 112 may move relative to each other axially (otherwise referred herein as longitudinally), e.g., along the longitudinal axis 114 (shown best in FIGS. 1B and 1C), and/or rotationally, e.g., about the longitudinal axis 114. Although not illustrated, the cylinder 110 may contain a fluid, such as a hydraulic fluid, air, and/or the like, to resist relative movement of the piston rod 112 and the cylinder 110 in the axial direction, e.g., along the axis 114.

As shown in FIGS. 1B and 1C, a seal 124 can be disposed between the cylinder 110 and the piston rod 112. The seal 124 may be a sliding seal and/or any type of seal that allows for the relative movement just described. In examples, the seal 124 may be designed to prevent leakage of any fluid retained in the cylinder 110. In practice, the seal 124 may inhibit some desirable relative movement. Specifically, the seal 124 may introduce friction, e.g., as stiction, between the cylinder 110 and the piston rod 112. During operation of the suspension system 100, a threshold axial load may be required to overcome the stiction force. At loads below this threshold, the cylinder 110 and the piston rod 112 may act as a single, rigid member. This may be undesirable, as the suspension system 100 may be unable to dampen these relatively lower forces, which may lead to a rougher ride for passengers in the vehicle. Failing to dampen these forces may also have other undesirable outcomes, including but not limited to added stress of components of the vehicle, which may lead to premature wear and/or failure and/or increased maintenance requirements.

Aspects of this disclosure also include a rotation inducing component. In the example of FIGS. 1A-1C, the rotation inducing component is embodied as a bushing structure 126. As shown in FIG. 1A, the bushing structure 126 is coupled to the distal end 122 of the piston rod 112. For example, the bushing structure 126 defines an axial opening 128, which may be press fit onto the distal end 122 of the piston rod 112. Of course, this coupling is for example only; other coupling techniques may be used.

As best illustrated in FIG. 1B, the bushing structure 126 has a first, bottom surface 130, and a second, top surface 132. Here, "bottom" and "top" generally correspond to the illustrated orientation, although the terms are used merely to different between the surfaces. In the illustrated example, the bottom surface 130 of the bushing structure 126 is fixed to the piston rod 112. As noted above, the bushing structure 126 may be pressed onto the distal end 122 of the piston rod 112. Although FIGS. 1B and 1C show the cylinder 110 and the piston rod 112 arranged vertically, this is for illustration only; as shown in FIG. 1A, in use, the cylinder 110 and the piston rod 112 may be angled, or otherwise arranged. The bushing structure 126 also includes a sidewall 134, extending between the bottom surface 130 and the top surface 132. In the illustrated embodiment, the sidewall 134 is substantially cylindrical. The sidewall 134 may have a thickness, defining the axial opening 128. In examples, the sidewall may be made of an elastomeric material, such as a rubber or the like. Although the sidewall 134 is illustrated as being substantially cylindrical, in other examples the sidewall 134 can be tapered, or otherwise shaped.

In examples, the bushing structure 126 may be similar in composition, shape, positioning, and/or orientation to a conventional bushing used in a conventional suspension system. However, unlike conventional bushings, the bushing structure 126 includes one or more voids 136 formed in the sidewall 134. The void(s) 136 are cavities or other structures that are intended to configure the bushing structure to rotate under an applied axial loading, as described further herein. The void(s) 136 are angled, e.g., relative to a plane normal to the axis 114 of the damping member 102. In the example of FIGS. 1A-1C, the void(s) 136 comprise(s) a single spiral or helical cutout through the sidewall 134. When the bushing structure 126 includes the axial opening 128, as in FIG. 1A, the void(s) 136 extend through the sidewall 134, e.g., from an outer surface to the axial opening 128. Although the void(s) 136 are shown as single, continuous cutout, in other examples a plurality of voids may be provided. For example, a plurality of voids, each angled relative to the plane normal to the axis 114, may be provided. Voids are illustrated as one feature of a bushing that can induce a twisting motion. Other features may include utility different materials, different physical configurations (e.g., a twisted bushing), etc.

In FIG. 1B, the cylinder 110, the piston rod 112, and the bushing structure 126 are depicted in a normal or "at rest" position. In this example the suspension system 100 may be coupled to a vehicle that is stopped, e.g., parked. The suspension system 100 may be subject to some pre-load associated with the vehicle, but no external (to the vehicle) forces are acting on the vehicle. To illustrate aspects of this disclosure, FIG. 1B also includes a first reference line 138a proximate the top surface 132 of the bushing structure 126, a second reference line 138b proximate the bottom surface 130 of the bushing structure 126, and a third reference line 138c on the piston rod 112, at the distal end 122. The reference lines 138a, 138b, 138c are generally vertically aligned in the example of FIG. 1B.

FIG. 1C shows the suspension system 100 under an applied force 140. The applied force 140 is illustrated as a compression force, e.g., which may be experienced during driving, such as on uneven road surfaces. Under the applied force 140, the bushing structure 126 compresses, e.g., the top surface 132 moves relatively closer to the bottom surface 130. In the example of FIG. 1C, the void(s) 136 are reduced in an axial dimension, as the void(s) 136 are "squeezed" together. In addition to narrowing, the angled void(s) 136 redirect at least a portion of the axially-applied force 140, e.g., along the angled direction associated with the void(s) 136, causing the top surface 132 of the bushing structure 126 to rotate, about the axis 114, relative to the bottom surface 130 of the bushing structure 126, generally as shown by the reference arrows 142. This relative rotation is also shown by the offset between the first reference line 138a and the second reference line 138b.

In the example of FIG. 1C, the top surface 132 is fixed, e.g., relative to a vehicle or a frame associated with a vehicle, so the twisting of the bushing structure 126 causes the bottom surface 130 to rotate as shown. As discussed above, the bottom surface 130 of the bushing structure 126 is fixed relative to the piston rod 112. Accordingly, the piston rod 112 also rotates about the axis 114, as shown by the third reference line 138c. The cylinder 110 is also fixed relative to the vehicle, e.g., via the joint 106. Accordingly, the rotation of the piston rod 112 cause the piston rod 112 to rotate relative to the cylinder 110, as shown by the arrows 144. The relative rotation of the cylinder 110 and the piston rod 112 may assist in overcoming stiction at the seal 124, as detailed herein. For example, by introducing a relative rotation, friction at the seal 124 may be overcome under a lower axial force 140 than in conventional arrangements that do not include the twisting achieved by the bushing structure 126.

In the example of FIGS. 1A-1C, the void(s) 136 are illustrated as passing through the sidewall 134. In other examples, however, the void(s) 136 may be formed as bores. For example, the void(s) 136 may be formed in an outer surface of the sidewall 134, but extend a depth that is less than a thickness of the sidewall 134. Similarly, one or more of the void(s) 136 may be formed in an inner surface of the sidewall 134, e.g., at the axial opening 128, but extend a depth into the sidewall 134 that is less than the thickness of the sidewall. In these or other examples, the bushing structure 126 may also include a fluid, e.g., oil, disposed in the void(s) 136. The inclusion of the fluid may allow for the bushing structure 126 to allow for tuning, e.g., such that the bushing structure 126 can have an axial stiffness, but with a damping that increases the rotational movement.

Figure 2A:
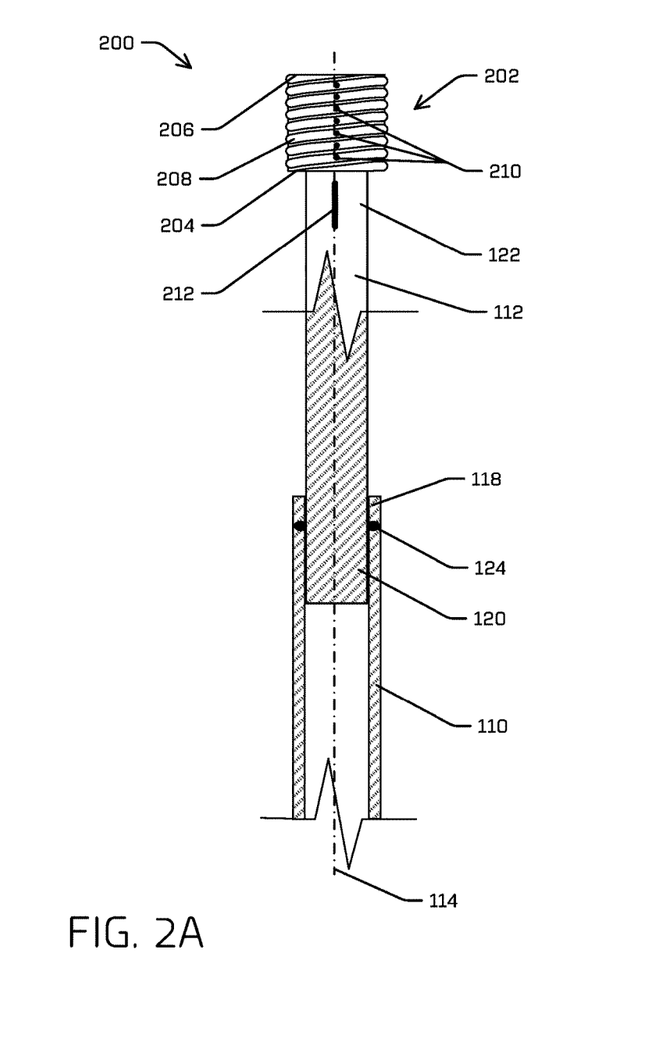
FIGS. 2A and 2B are partial cross-sectional views of a suspension system like that shown in FIG. 1A, taken along section line B-B in FIG. 1A, showing details of an alternative rotation inducing component including a bushing structure, in accordance with aspects of this disclosure.
Figure 2B:
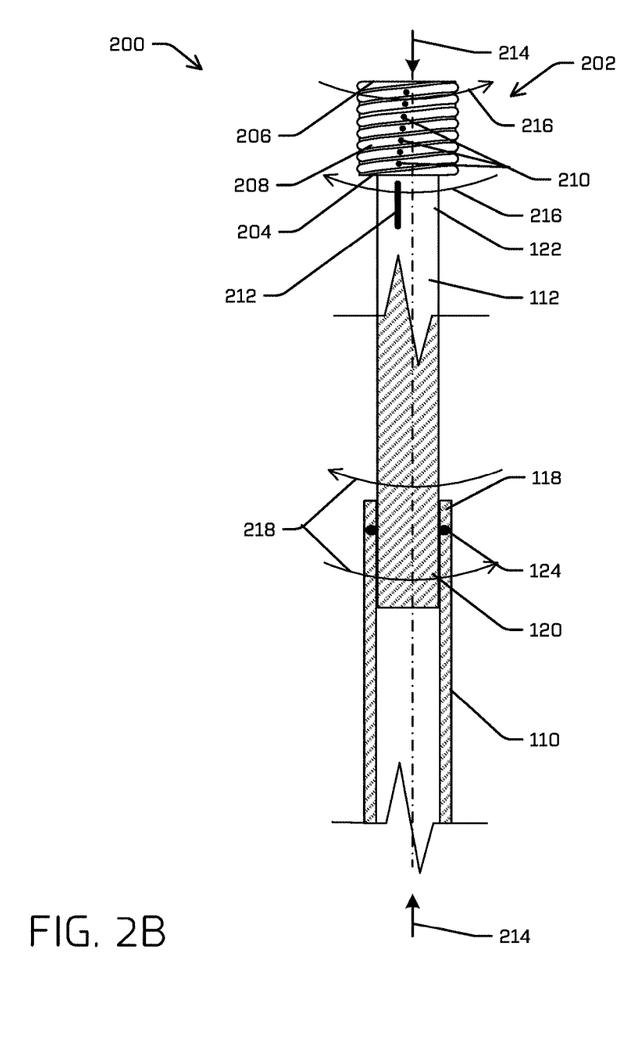

FIGS. 2A and 2B illustrate additional aspects of this disclosure. Specifically, those Figures show an alternate suspension system 200, which may be used in substantially the same manner as the suspension system 100. Like parts in the suspension system 200 are given the same reference numerals. For instance, the suspension system 200 includes the cylinder 110 and the piston rod 112 configured to move relative to the cylinder 110. Proximate the distal end 122 of the piston rod 112, the suspension system 200 includes a different rotation inducing member. In the example of FIGS. 2A and 2B, the alternative rotation inducing member is a bushing structure 202.

The bushing structure 202 includes a first, bottom surface 204 spaced from a second, top surface 206, e.g., along the axis 114. A sidewall 208 extends between the bottom surface 204 and the top surface 206. Unlike the sidewall 134 of the bushing structure 126, the sidewall 208 is a helical or spiral sidewall 208. For example, the sidewall 208 may be formed of one or more strands, e.g., elastomeric strands, wrapped about an axis, coaxial with the axis 114 in FIGS. 2A and 2B. In some examples, the sidewall 208 may be formed of a single strand, e.g., which may be continuously wound to form the sidewall 208. In other examples, the sidewall 208 can comprise a number of strands, e.g., as alternating or otherwise intertwined spiral or helical patterns. Without limitation, two strands may be wrapped as double helix to form the sidewall 208, three strands may be wrapped as a triple helix, and so forth. Adjacent layers or coils of the strands may be fixed using conventional methods, e.g., bonding, molding, and/or the like, to form the completed sidewall 208. When multiple strands are used, the two (or more) strands may have different characteristics. For example, the strands may have varying profiles, diameters, thicknesses, material compositions, and/or the like. Although the sidewall 208 may be formed via winding, as just described, in other examples the sidewall may be otherwise formed, e.g., via molding or the like. Regardless of the method of fabrication, the sidewall 208 may have a number of windings that are angled, e.g., as a spiral or helical pattern. As shown, because of the helical sidewall 208, the bushing structure 202 resembles a compressed spring.

In FIG. 2A, the cylinder 110, the piston rod 112, and the bushing structure 202 are depicted in a normal or "at rest" position. In this example the suspension system 200 may be coupled to a vehicle that is stopped, e.g., parked. The suspension system 200 may be subject to some pre-load associated with the vehicle, but no external (to the vehicle) forces are acting on the vehicle. To illustrate aspects of this disclosure, FIG. 2A also includes a series of reference markings 210 formed on individual windings of the sidewall 208. The reference markings 210 are generally aligned vertically in the orientation of FIG. 2A. FIG. 2A also illustrates a reference line 212 on the piston rod 112, at the distal end 122. The reference line 212 is also generally vertically aligned in the example of FIG. 2A.

FIG. 2B shows the suspension system 200 under an applied force 214. The applied force 214 is illustrated as a compression force, e.g., which may be experienced during driving, such as on uneven road surfaces. Under the applied force 214, the bushing structure 202 compresses, e.g., the top surface 206 moves relatively closer to the bottom surface 204. For example, the sidewall 208 may be made of a compressible material, e.g., an elastomeric material, that allows the bushing structure 202 to compress in the axial direction. In addition to the bushing structure 202 compressing, the helical sidewall 208 redirects at least a portion of the axially-applied force 214, e.g., along the angled direction associated with the individual strands, causing the top surface 206 of the bushing structure 202 to rotate, about the axis 114, relative to the bottom surface 204 of the bushing structure 202, generally as shown by the reference arrows 216. This relative rotation is also shown by the offset between the reference markings 210.

In the example of FIG. 2B, the top surface 206 of the bushing structure 202 is fixed, e.g., relative to a vehicle, so the twisting of the bushing structure 202 causes the bottom surface 204 to rotate as shown. As with the examples discussed above, the bottom surface 204 of the bushing structure 202 may be fixed relative to the piston rod 112. Accordingly, the piston rod 112 also rotates about the axis 114, as shown by the reference line 212. The cylinder 110 is also fixed relative to the vehicle, e.g., via the joint 106. Accordingly, the rotation of the piston rod 112 cause the piston rod 112 to rotate relative to the cylinder 110, as shown by the arrows 216. The relative rotation of the cylinder 110 and the piston rod 112 may assist in overcoming stiction at the seal 124, as detailed herein. For example, by introducing a relative rotation, friction at the seal 124 may be overcome under a lower axial force 214 than in conventional arrangements that do not include the twisting achieved by the bushing structure 202.

In the examples of FIGS. 1A-2B, the rotation inducing component is embodied as the bushing structures 126, 202. In examples, the bushing structures 126, 202 may be used on conventional suspension systems. For instance, the bushing structures 126, 202 may replace a conventional bushing. Without limitation, the bushing structures 126, 202 may have a size, shape, and/or the like, generally corresponding to the size, shape, and/or the like of a conventional bushing. Thus, the bushing structures 126, 202 may be dropped into an existing suspension system. In this way, the benefits of this disclosure may be obtained with relatively little change to existing manufacturing, assembly, and/or maintenance processes. In other examples, however, the rotation inducing component may be other than embodied as a bushing structure.

In the examples of FIGS. 1A-2B, the bushing structures 126, 202 are single, e.g., unitary, structures. However, in other examples, the bushing structures may include more than one component. Without limitation, a bushing structure according to this disclosure can include mounting, structural, and/or other components, which may be used to secure the bushing structure, e.g., to the piston rod, to a frame of a vehicle, or the like. In at least one example, the bushing structure may also include an outer cylinder, e.g., a sleeve or the like, that retains the illustrated portions of the bushing structure. In other examples, the bushing structure 126, 202 may be include a spring, e.g., a compression spring. For instance, the bushing structure 126, 202 may be a metal or other rigid spring, which may be coated with, embedded in, or otherwise coupled to an elastomeric material. In still further examples, the bushing structure 202 may include a spring disposed over, e.g., surrounding, an elastomeric, polymeric, or other structure. For example, and without limitation, the spring may be disposed over the bushing structures 126, 202.

In still additional examples, the bushing structure may include one or more features that provide additional, off-axis mass to the bearing structure. In examples, the off-axis mass may promote some oscillation of the bushing structure 126, 202 after a change in axial loading introduces an additional relative rotation, as discussed herein. The oscillation may promote continued relative motion of the piston rod relative to the cylinder, e.g., even when the axial force becomes constant, allowing for the continued reduction (or elimination) of static friction force at the seal.

Figure 3A:
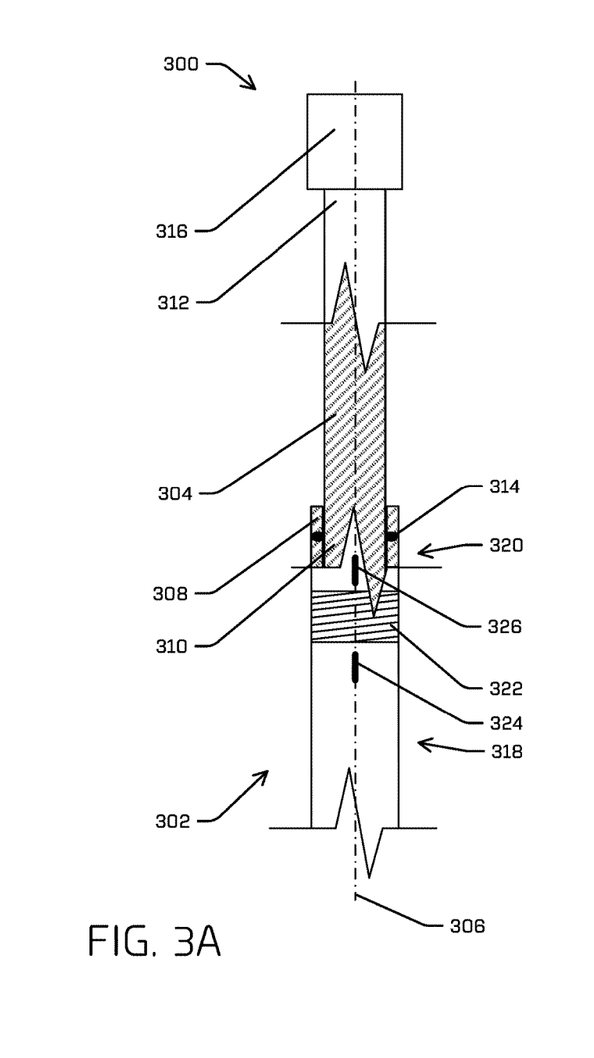
FIGS. 3A and 3B are partial cross-sectional views of a suspension system like that shown in FIG. 1A, showing details of an alternative rotation inducing component incorporated into a cylinder of the suspension system, in accordance with aspects of this disclosure.
Figure 3B:
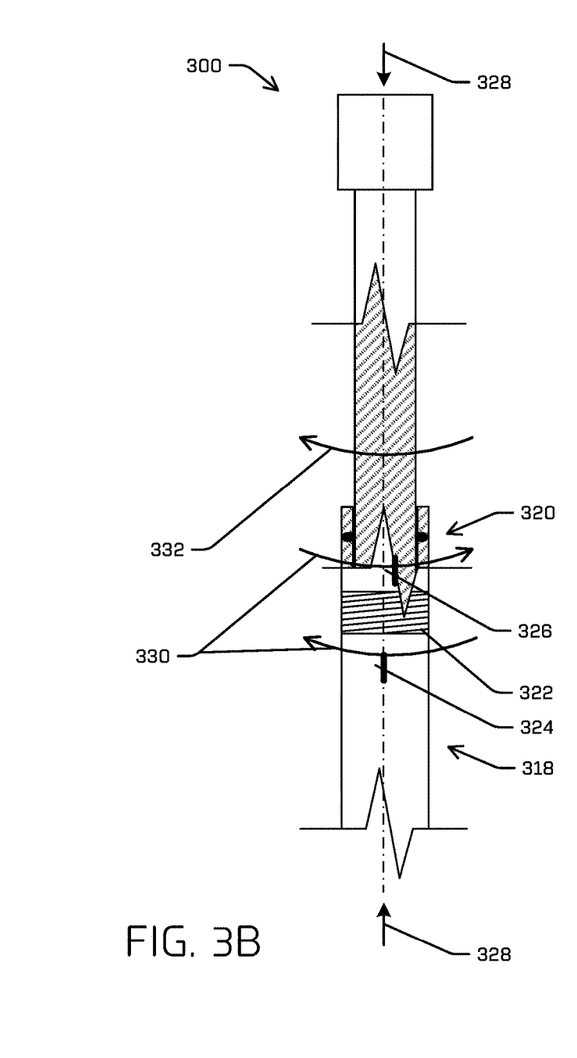

FIGS. 3A and 3B illustrate aspects of an alternate suspension system 300 according to aspects of this disclosure. FIGS. 3A and 3B are partial section views similar to those of FIGS. 1B and 1C and FIGS. 2A and 2B.

As shown in FIGS. 3A and 3B, the suspension system 300 includes a cylinder 302 and a piston rod 304. The cylinder 302 and the piston rod 304 are generally elongate members, extending along an axis 306. The cylinder 302 extends from a first, lower closed end (not shown in FIGS. 3A and 3B) to a second, upper open end 308 configured to receive the piston rod 304. The piston rod 304 extends from a first, lower end 310, received in the open end 308 of the cylinder 302, to a second, distal end 312 spaced from the cylinder 302. The piston rod 304 is configured to move relative to the cylinder 302. For example, the cylinder 302 and the piston rod 304 may move relative to each other axially, e.g., along the axis 306, and/or rotationally, e.g., about the axis 306. Although not illustrated, the cylinder 302 may contain a fluid, such as a hydraulic fluid, air, and/or the like, to resist relative movement of the piston rod 304 and the cylinder 302 in the axial direction, e.g., along the axis 306.

As shown in FIGS. 3A and 3B, a seal 314 is disposed between the cylinder 302 and the piston rod 304. The seal 314 may be a sliding seal and/or any type of seal that allows for the relative movement just described. In examples, the seal 314 may be designed to prevent leakage of any fluid retained in the cylinder 302. In practice, the seal 314 may inhibit some desirable relative movement. Specifically, the seal 314 may introduce friction, e.g., as stiction, between the cylinder 302 and the piston rod 304. During operation of the suspension system 300, a threshold axial load may be required to overcome the stiction force. At loads below this threshold, the cylinder 302 and the piston rod 304 may act as a single, rigid member. This may be undesirable, as the suspension system 300 may be unable to dampen these relatively lower forces, which could lead to a rougher ride for passengers in the vehicle. Failing to dampen these forces may also have other undesirable outcomes, including but not limited to added stress of components of the vehicle, which may lead to premature wear and/or failure, and/or increased maintenance requirements.

Also in FIGS. 3A and 3B, a bushing 316 is illustrated as being coupled to the distal end 312 of the piston rod 304. For example, the bushing 316 may be a conventional bushing, not one of the bushing structures 126, 202. Instead, in the example of FIGS. 3A and 3B, the cylinder 302 comprises the rotation inducing component.

More specifically, the cylinder 302 is illustrated as including a first cylinder portion 318 and a second cylinder portion 320. The first cylinder portion 318 and the second cylinder portion 320 are separated along the axis 306. The first cylinder portion 318 may include the closed end described above, and the second cylinder portion 320 may include the open end 308. The seal 314 may be coupled to the second cylinder portion 320.

A spacer 322 couples the first cylinder portion 318 to the second cylinder portion 320. The spacer 322 may be a cylindrical sidewall that extends an axial distance between the first cylinder portion 318 and the second cylinder portion 320. The sidewall of the spacer 322 has one or more angled sections, e.g., formed as spiral or helical sections. In this way, the sidewall of the spacer 322 may be similar to the sidewall 208 of the bushing structure 202 described above. In other examples, the sidewall of the spacer 322 may be formed as a bellows or similar structure, but with the individual sections being angled relative to a plane normal to the axis 306, e.g., instead of being arranged in a plane normal to the axis 306 as in a conventional bellows With the bellows structure, the spacer 322 will also maintain an enclosed volume in the cylinder 302, e.g., the volume into which the piston rod 304 extends and/or the fluid is retained In FIG. 3A, the cylinder 302 and the piston rod 304 are depicted in a normal or "at rest" position. In this example, the suspension system 300 may be coupled to a vehicle that is stopped, e.g., parked. The suspension system 300 may be subject to some pre-load associated with the vehicle, but no external (to the vehicle) forces are acting on the vehicle. To illustrate aspects of this disclosure, FIG. 3A also includes a first reference line 324, on the first cylinder portion 318, and a second reference line 326, on the second cylinder portion 320. The reference lines 324, 326 are generally vertically aligned in the example of FIG. 3A.

FIG. 3B shows the suspension system 300 under an applied force 328. The applied force 328 is illustrated as a compression force, e.g., which may be experienced during driving, such as on uneven road surfaces. Under the applied force 328, the spacer 322 compresses, such that the first cylinder portion 318 moves relatively closer to the second cylinder portion 320. For example, the sidewall of the spacer may be made of a corrugated or similar type material that allows the spacer 322 to compress in the axial direction. In addition to compressing, the helical sidewall of the spacer 322 redirects at least a portion of the axially-applied force 328, e.g., along the angled direction associated with the individual sections, causing the first cylinder portion 318 to rotate, about the axis 306, relative to the second cylinder portion 320, generally as shown by the reference arrows 330. This relative rotation is also shown by the offset between the reference lines 324, 326.

In the example of FIG. 3B, the first cylinder portion 318 of the cylinder 302 is fixed, e.g., relative to a vehicle, so the twisting of the spacer 322 causes the second cylinder portion 320 to rotate as shown. In this example, the piston rod 304 may be fixed relative to the vehicle, too. Accordingly, the second cylinder portion 320 also rotates relative to the piston rod 304, as shown by the arrow 332. The relative rotation of the cylinder 302 and the piston rod 304 may assist in overcoming stiction at the seal 314, as detailed herein. For example, by introducing a relative rotation, friction at the seal 314 may be overcome under a lower axial force 328 than in conventional arrangements that do not include the twisting achieved by the spacer 322.

Although the example of FIGS. 3A and 3B show the cylinder 302 as including the spacer, in other examples a similar objective could be achieved by including a similar spacer in the piston rod 304. In this arrangement, the piston rod may have two axially spaced-apart sections coupled with a spacer that twists under an axial force, like the spacer 322.

Other modifications also are contemplated. For example, although FIGS. 1A-2B show the rotation inducing member as being incorporated in a bushing structure (and not in the cylinder), and the example of FIGS. 3A and 3B show the rotation inducing member as being incorporated into the cylinder (and not the bushing structure), alternative implementations may include more than one rotation inducing member. Without limitation, in the example of FIGS. 3A and 3B, the bushing 316 may be replaced with one of the bushing structures 126, 202 discussed above. That is, more than one rotation inducing member may be provided.

Figure 4:
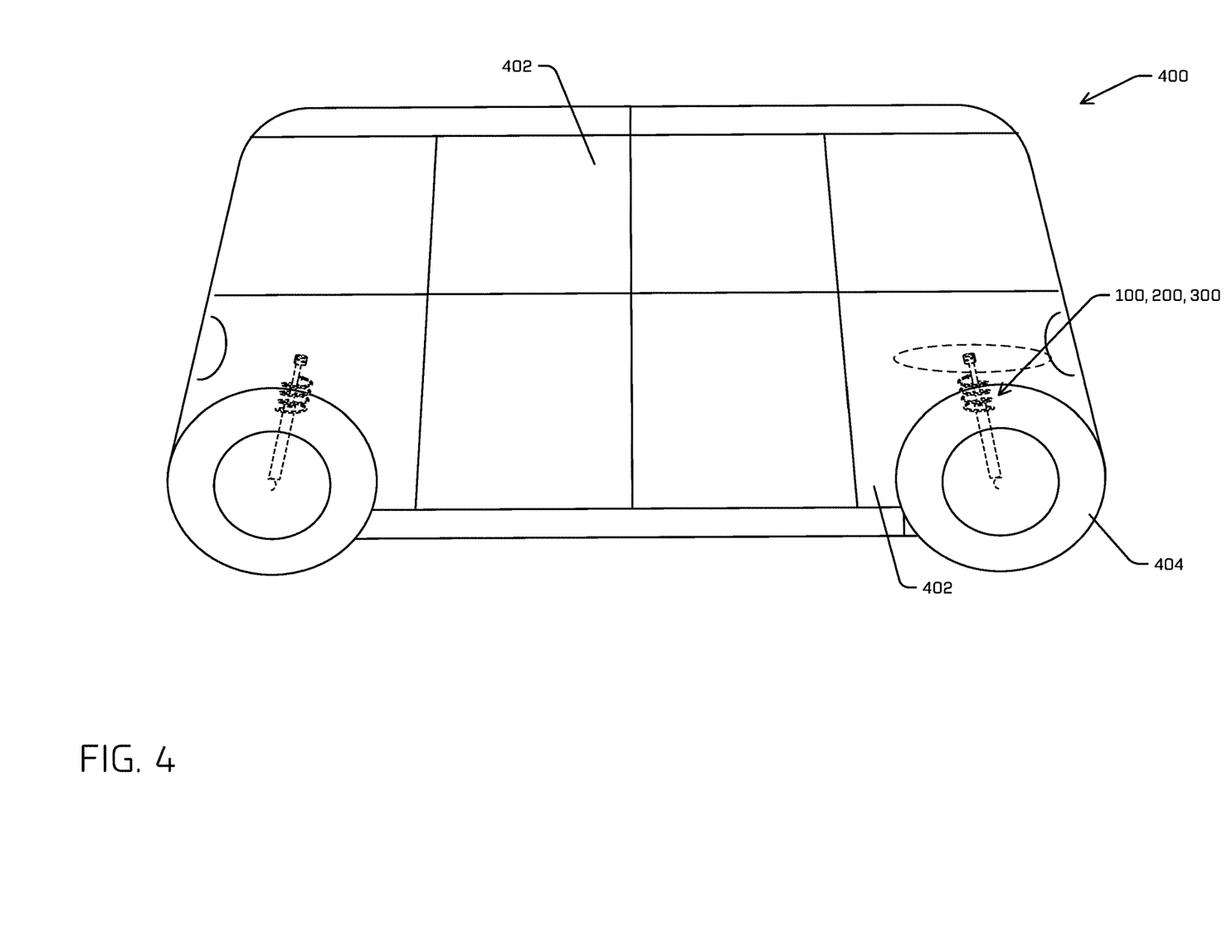
FIG. 4 is an example diagram illustrating the implementation of the system as described herein in a Macpherson strut.

FIG. 4 shows an example implementation of the suspension systems described herein. FIG. 4 is for example only, to demonstrate applied of the described structure. Additional operations and permutations may be implemented based on these descriptions. As described earlier, the suspension systems 100, 200, 300 described herein may be employed in any environment in which suspension systems are used. For purposes of illustration only, the operation of the suspension systems 100, 200, 300 is discussed in conjunction with a vehicle suspension system. This example is only illustrative and should not be viewed as limiting on the use of the systems described herein.

In examples, a vehicle 400 may include a vehicle structure or body 402. In examples, the vehicle 400 include one of the suspension systems 100, 200, 300. In examples, the suspension systems 100, 200, 300 may be part of the vehicle structure 402. In examples, the suspension systems 100, 200, 300 may be configured to connect a wheel 404 to the vehicle structure 402. For example, the suspension systems 100, 200, 300 may couple the wheel 404 to a chassis, unibody, frame, or other portion comprising the vehicle structure. In examples, the vehicle 400 may include one or more instances the suspension systems 100, 200, 300, e.g., one instance for each of the wheels 404, for a pair of wheels 404, or the like.

In examples, the vehicle 400 may be configured to travel via a road network from one geographic location to a destination carrying one or more of the occupants. For example, the interior of vehicle 400 may include a plurality of seats, which may be provided in any relative arrangement.

In examples, the vehicle 400 may include an example carriage-style seating arrangement in a substantially central portion of the vehicle interior. For example, the vehicle 400 may include two or more rows of seats, and in some examples, two of the rows of seats may face each other. One or more of the rows of seats may include two seats. In some examples, one or more of the two seats may be a bench-style seat configured to provide seating for one or more occupants. Other relative arrangements and numbers of seats are contemplated.

In examples, the vehicle 400 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 300 may be configured to control all functions from start to completion of the trip, including all parking functions, it may not include a driver and/or controls for driving the vehicle 400, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially- or fully-autonomously controlled.

In examples, the vehicle 400 may be any configuration of vehicle, such as, for example, a van, a sport utility vehicle, a cross-over vehicle, a truck, a bus, an agricultural vehicle, and a construction vehicle. The vehicle 400 may be powered by one or more internal combustion engines, one or more electric motors, hydrogen power, any combination thereof, and/or any other suitable power sources. In examples, the vehicle 400 may have four wheels. In examples, the systems and methods described herein may be incorporated into vehicles having fewer or a greater number of wheels, tires, and/or tracks. In examples, the vehicle 400 may have four-wheel steering and may be multi-directional, configured to operate generally with equal performance characteristics in all directions. For example, the vehicle 400 may be bidirectional such that a first end of the vehicle 400 is the leading end of the vehicle 400 when travelling in a first direction, and such that the first end becomes the trailing end of the vehicle 400 when traveling in the opposite, second direction. Similarly, a second end of the vehicle 400 may be the leading end of the vehicle 400 when travelling in the second direction, and such that the second end becomes the trailing end of the vehicle 400 when traveling in the opposite, first direction. These example characteristics may facilitate greater maneuverability, for example, in small spaces or crowded environments, such as parking lots and urban areas. Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Although the subject matter presented herein has been described in language specific to computer structural features, methodological acts, and computer readable media, it is to be understood that the subject matter defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present disclosure, which is set forth in the following claims.

EXAMPLE CLAUSES

A: An example suspension system for a vehicle, the suspension system comprising: a cylinder coupled to a wheel; a piston rod disposed at least partially in the cylinder and extending from the cylinder along an axial direction to a distal end, the piston rod being configured to move relative to the cylinder; a seal between the cylinder and the piston rod; and a bushing structure coupled to the distal end of the piston rod, the bushing structure having a first end coupled to the distal end of the rod and a second end spaced from the first end along the axial direction, the bushing structure being configured such that a change in a load applied generally along the axial direction causes the first end of the bushing structure to rotate relative to the second end of the bushing structure, such that the piston rod rotates relative to the cylinder to overcome a static friction force at the seal.

B: The suspension system of example A, wherein the bushing structure comprises: a sidewall extending between the first end and the second end; and one or more voids in the sidewall, the one or more voids being angled relative to a plane normal to the axial direction.

C: The suspension system of example A or example B, wherein: the sidewall defines an axial opening in the bushing structure; and the one or more voids extend through the sidewall, from an outer surface to the axial opening.

D: The suspension system of any one example A through example C, wherein the one or more voids are substantially helical.

E: The suspension system of any one example A through example D, wherein the bushing structure comprises a substantially helical sidewall.

F: The suspension system of any one example A through example E, wherein the substantially helical sidewall comprises a first helix having a first hardness and a second helix having a second hardness different from the first hardness.

G: An example suspension system includes: a cylinder extending along an axis; a piston rod disposed at least partially in the cylinder and extending from the cylinder, along the axis, to a distal end, the piston rod being configured to move relative to the cylinder; a seal between the cylinder and the piston rod; and a rotation inducing component configured to, under a change in axial loading, cause the piston rod to rotate relative to the cylinder, about the axis, rotation of the piston rod relative to the cylinder at least in part overcoming a friction force between the seal and one of the piston rod or the cylinder.

H: The suspension system of example G, wherein the rotation inducing component comprises a bushing structure coupled to the distal end of the piston rod.

I: The suspension system of example G or example H, wherein the bushing structure comprises: a sidewall extending between a first end and a second end; and one or more voids in the sidewall, the one or more voids being angled relative to a plane normal to the axis.

J: The suspension system of any one example G through example I, wherein: the sidewall defines an axial opening in the bushing structure; and the one or more voids extend through the sidewall, from an outer surface to the axial opening.

K: The suspension system of any one example G through example J, wherein the one or more voids are substantially helical.

L: The suspension system of any one example G through example K, wherein the bushing structure comprises a substantially helical sidewall extending between a first end and a second end.

M: The suspension system of any one example G through example L, wherein the substantially helical sidewall comprises a first helix having a first material property and a second helix having a second material property corresponding to the first material property different from the first material property.

N: The suspension system of any one example G through example M, wherein: the cylinder comprises: a first cylinder portion, and a second cylinder portion spaced from the first cylinder portion along the axis; and the rotation inducing component comprises a spacer disposed between the first cylinder portion and the second cylinder portion.

O: The suspension system of any one example G through example N, wherein the spacer comprises at least one spiral section.

P: The suspension system of any one example G through example O, wherein, under an axial load, the spacer compresses along the axis and at least a portion of the spiral section rotates about the axis, causing the first cylinder portion to rotate relative to the second cylinder portion.

Q: An example vehicle includes: a frame; a wheel; and a suspension system coupled to the frame and to the wheel, the suspension system comprising: a cylinder extending along an axis; a piston rod disposed at least partially in the cylinder and extending from the cylinder, along the axis, to a distal end, the piston rod being configured to move relative to the cylinder; and a rotation inducing component configured to, under a change in axial loading, cause the piston rod to rotate relative to the cylinder to overcome a friction force at a seal between the piston rod and the cylinder.

R: The vehicle of example Q, wherein the rotation inducing component comprises a bushing structure including a sidewall extending between a first end and a second end; and one or more voids in the sidewall, the one or more voids being angled relative to a plan normal to the axis.

S: The vehicle of example S or example R, wherein the rotation inducing component comprises a bushing structure including a substantially helical sidewall extending between a first end and a second end.

T: The vehicle of any one of example Q through example S, wherein: the cylinder comprises: a first cylinder portion, and a second cylinder portion spaced from the first cylinder portion along the axis; and the rotation inducing component comprises a spacer disposed between the first cylinder portion and the second cylinder portion.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

What is claimed is:

1. A suspension system for a vehicle, the suspension system comprising:
   a cylinder coupled to a wheel;
   a piston rod disposed at least partially in the cylinder and extending from the cylinder along an axial direction to a distal end, the piston rod being configured to move relative to the cylinder;
   a seal between the cylinder and the piston rod; and
   a bushing structure coupled to the distal end of the piston rod, the bushing structure having a first end coupled to the distal end of the rod and a second end spaced from the first end along the axial direction, the bushing structure being configured such that a change in a load applied generally along the axial direction causes the first end of the bushing structure to rotate relative to the second end of the bushing structure, such that the piston rod rotates relative to the cylinder to overcome a static friction force at the seal.

2. The suspension system of claim 1, wherein the bushing structure comprises:
   a sidewall extending between the first end and the second end; and
   one or more voids in the sidewall, the one or more voids being angled relative to a plane normal to the axial direction.

3. The suspension system of claim 2, wherein:
   the sidewall defines an axial opening in the bushing structure; and
   the one or more voids extend through the sidewall, from an outer surface to the axial opening.

4. The suspension system of claim 2, wherein the one or more voids are substantially helical.

5. The suspension system of claim 1, wherein the bushing structure comprises a substantially helical sidewall.

6. The suspension system of claim 5, wherein the substantially helical sidewall comprises a first helix having a first hardness and a second helix having a second hardness different from the first hardness.

7. A suspension system comprising:
   a cylinder extending along an axis;
   a piston rod disposed at least partially in the cylinder and extending from the cylinder, along the axis, to a distal end, the piston rod being configured to move relative to the cylinder;
   a seal between the cylinder and the piston rod; and
   a rotation inducing component configured to, under a change in axial loading, cause the piston rod to rotate relative to the cylinder, about the axis, rotation of the piston rod relative to the cylinder at least in part overcoming a friction force between the seal and one of the piston rod or the cylinder.

8. The suspension system of claim 7, wherein the rotation inducing component comprises a bushing structure coupled to the distal end of the piston rod.

9. The suspension system of claim 8, wherein the bushing structure comprises:
   a sidewall extending between a first end and a second end; and
   one or more voids in the sidewall, the one or more voids being angled relative to a plane normal to the axis.

10. The suspension system of claim 9, wherein:
    the sidewall defines an axial opening in the bushing structure; and
    the one or more voids extend through the sidewall, from an outer surface to the axial opening.

11. The suspension system of claim 10, wherein the one or more voids are substantially helical.

12. The suspension system of claim 8, wherein the bushing structure comprises a substantially helical sidewall extending between a first end and a second end.

13. The suspension system of claim 12, wherein the substantially helical sidewall comprises a first helix having a first material property and a second helix having a second material property corresponding to the first material property different from the first material property.

14. The suspension system of claim 7, wherein:
the cylinder comprises:
    a first cylinder portion, and
    a second cylinder portion spaced from the first cylinder portion along the axis; and
the rotation inducing component comprises a spacer disposed between the first cylinder portion and the second cylinder portion.

15. The suspension system of claim 14, wherein the spacer comprises at least one spiral section.

16. The suspension system of claim 15, wherein, under an axial load, the spacer compresses along the axis and at least a portion of the spiral section rotates about the axis, causing the first cylinder portion to rotate relative to the second cylinder portion.

17. A vehicle comprising:
a frame;
a wheel; and
a suspension system coupled to the frame and to the wheel, the suspension system comprising:
    a cylinder extending along an axis;
    a piston rod disposed at least partially in the cylinder and extending from the cylinder, along the axis, to a distal end, the piston rod being configured to move relative to the cylinder; and
    a rotation inducing component configured to, under a change in axial loading, cause the piston rod to rotate relative to the cylinder to overcome a friction force at a seal between the piston rod and the cylinder.

18. The vehicle of claim 17, wherein the rotation inducing component comprises a bushing structure including a sidewall extending between a first end and a second end; and one or more voids in the sidewall, the one or more voids being angled relative to a plan normal to the axis.

19. The vehicle of claim 17, wherein the rotation inducing component comprises a bushing structure including a substantially helical sidewall extending between a first end and a second end.

20. The vehicle of claim 17, wherein:
the cylinder comprises:
    a first cylinder portion, and
    a second cylinder portion spaced from the first cylinder portion along the axis; and
the rotation inducing component comprises a spacer disposed between the first cylinder portion and the second cylinder portion.

* * * * *